(12) United States Patent
Greene et al.

(10) Patent No.: US 9,501,377 B2
(45) Date of Patent: Nov. 22, 2016

(54) GENERATING AND IMPLEMENTING DATA INTEGRATION JOB EXECUTION DESIGN RECOMMENDATIONS

(71) Applicant: International Business Machines Corporation, Armonk, NY (US)

(72) Inventors: Lawrence A. Greene, Plainville, MA (US); Eric A. Jacobson, Arlington, MA (US); Yong Li, Newton, MA (US); Xiaoyan Pu, Chelmsford, MA (US)

(73) Assignee: International Business Machines Corporation, Armonk, NY (US)

( * ) Notice: Subject to any disclaimer, the term of this patent is extended or adjusted under 35 U.S.C. 154(b) by 168 days.

(21) Appl. No.: 14/217,567

(22) Filed: Mar. 18, 2014

(65) Prior Publication Data

US 2015/0268990 A1   Sep. 24, 2015

(51) Int. Cl.
*G06F 11/30* (2006.01)
*G06F 9/48* (2006.01)
*G06F 9/50* (2006.01)
*G06F 11/34* (2006.01)

(52) U.S. Cl.
CPC ............ *G06F 11/30* (2013.01); *G06F 9/4843* (2013.01); *G06F 9/50* (2013.01); *G06F 11/34* (2013.01)

(58) Field of Classification Search
None
See application file for complete search history.

(56) References Cited

U.S. PATENT DOCUMENTS

| | | |
|---|---|---|
| 4,850,027 A | 7/1989 | Kimmel |
| 4,974,223 A | 11/1990 | Ancheta et al. |
| 5,197,127 A * | 3/1993 | Waclawsky .......... G06F 13/00 370/229 |
| 5,473,773 A | 12/1995 | Aman et al. |
| 5,517,323 A | 5/1996 | Propach et al. |
| 5,539,531 A | 7/1996 | Propach et al. |
| 5,566,000 A | 10/1996 | Propach et al. |
| 5,937,202 A | 8/1999 | Crosetto |
| 6,311,265 B1 | 10/2001 | Beckerle et al. |
| 6,330,008 B1 | 12/2001 | Razdow et al. |
| 6,434,613 B1 | 8/2002 | Bertram et al. |

(Continued)

FOREIGN PATENT DOCUMENTS

| | | |
|---|---|---|
| EP | 0210434 B1 | 9/1993 |
| EP | 0419805 B1 | 11/1995 |

(Continued)

OTHER PUBLICATIONS

"Hadoop Performance Monitoring", hadoop-toolkit wiki, update Jun. 14, 2010 by impetus.opensource. https://code.google.com/p/hadoop-toolkit/wiki/HadoopPerformanceMonitoring.

(Continued)

*Primary Examiner* — Benjamin Wu
(74) *Attorney, Agent, or Firm* — Laura E. Gisler (57) ABSTRACT

The method of managing performance of data integration are described. A performance analyzer may receive data about a data integration job execution. The performance analyzer may determine whether there is a performance issue of the data integration job execution. The performance analyzer analyzes the data about the data integration job execution when there is a performance issue. The performance analyzer generates a job execution design recommendation based on the analysis of the data and a set of predefined recommendation rules. The performance analyzer then displays the data about the data integration job execution and when there is a generated job execution design recommendation, displaying the job execution design recommendation.

12 Claims, 6 Drawing Sheets

(56) References Cited

U.S. PATENT DOCUMENTS

| | | |
|---|---|---|
| 6,457,143 B1 | 9/2002 | Yue |
| 6,470,464 B2 | 10/2002 | Bertram et al. |
| 6,557,035 B1 | 4/2003 | McKnight |
| 6,721,826 B2 | 4/2004 | Hoglund |
| 6,801,938 B1 | 10/2004 | Bookman et al. |
| 6,970,805 B1 | 11/2005 | Bierma et al. |
| 7,203,746 B1* | 4/2007 | Harrop ................ G06F 9/5022 709/224 |
| 7,299,216 B1 | 11/2007 | Liang et al. |
| 7,673,291 B2 | 3/2010 | Dias et al. |
| 7,689,690 B2 | 3/2010 | Loboz et al. |
| 7,748,001 B2 | 6/2010 | Burns et al. |
| 8,041,834 B2 | 10/2011 | Ferri et al. |
| 8,055,367 B2 | 11/2011 | Kneisel et al. |
| 8,122,050 B2 | 2/2012 | Mordvinov et al. |
| 8,126,315 B2 | 2/2012 | Kim et al. |
| 8,225,291 B2 | 7/2012 | Chung et al. |
| 8,234,635 B2 | 7/2012 | Isshiki et al. |
| 8,370,823 B2 | 2/2013 | Bashkansky et al. |
| 8,738,972 B1 | 5/2014 | Bakman et al. |
| 2003/0014507 A1 | 1/2003 | Bertram et al. |
| 2003/0061324 A1 | 3/2003 | Atherton et al. |
| 2003/0061413 A1 | 3/2003 | Hoglund |
| 2003/0120778 A1* | 6/2003 | Chaboud ............. G06F 9/5011 709/225 |
| 2004/0015381 A1 | 1/2004 | Johnson et al. |
| 2004/0059701 A1 | 3/2004 | Fedorov |
| 2004/0221038 A1* | 11/2004 | Clarke, Jr. ........... G06F 9/5072 709/226 |
| 2005/0050404 A1* | 3/2005 | Castelli ............. G06F 11/3409 714/57 |
| 2005/0071842 A1* | 3/2005 | Shastry ................ G06F 9/5038 718/100 |
| 2005/0187991 A1* | 8/2005 | Wilms .............. G06F 17/30563 |
| 2005/0222819 A1* | 10/2005 | Boss ................... G06Q 10/06 702/186 |
| 2005/0268299 A1* | 12/2005 | Picinich ................ G06F 9/485 718/100 |
| 2006/0153090 A1* | 7/2006 | Bishop ................ G06Q 10/06 370/252 |
| 2006/0218450 A1 | 9/2006 | Malik et al. |
| 2007/0118401 A1* | 5/2007 | Mahesh ............. G06F 19/327 705/2 |
| 2008/0091720 A1* | 4/2008 | Klumpp ................. G06F 8/10 |
| 2008/0127149 A1 | 5/2008 | Kosche et al. |
| 2008/0222634 A1 | 9/2008 | Rustagi |
| 2008/0282232 A1 | 11/2008 | Cong et al. |
| 2009/0066712 A1 | 3/2009 | Gilger |
| 2009/0077005 A1* | 3/2009 | Yung .................. G06F 9/4443 |
| 2009/0307597 A1 | 12/2009 | Bakman |
| 2010/0036810 A1 | 2/2010 | Wu et al. |
| 2010/0125565 A1* | 5/2010 | Burger ............. G06F 17/30433 707/713 |
| 2010/0250748 A1* | 9/2010 | Sivasubramanian . G06F 9/5016 709/226 |
| 2010/0312776 A1* | 12/2010 | Burrichter ......... G06F 17/30395 707/759 |
| 2011/0061057 A1 | 3/2011 | Harris et al. |
| 2011/0099559 A1* | 4/2011 | Kache ................. G06F 9/5061 719/318 |
| 2011/0179371 A1* | 7/2011 | Kopycinski ........... G06Q 10/10 715/772 |
| 2011/0225017 A1* | 9/2011 | Radhakrishnan G06Q 10/06315 705/7.25 |
| 2011/0229071 A1 | 9/2011 | Vincelette et al. |
| 2012/0044814 A1 | 2/2012 | Natarajan et al. |
| 2012/0054147 A1* | 3/2012 | Goetz .............. G06F 17/30563 707/602 |
| 2012/0102007 A1* | 4/2012 | Ramasubramanian G06F 17/30563 707/705 |
| 2012/0154405 A1 | 6/2012 | Baumgartner et al. |
| 2012/0278594 A1 | 11/2012 | Kumar et al. |
| 2012/0327794 A1 | 12/2012 | Han et al. |
| 2013/0024179 A1 | 1/2013 | Mazzaro et al. |
| 2013/0176871 A1 | 7/2013 | Bertze et al. |
| 2013/0185702 A1 | 7/2013 | Choi et al. |
| 2013/0227573 A1* | 8/2013 | Morsi .................. G06F 9/5083 718/100 |
| 2014/0026150 A1 | 1/2014 | Kline et al. |
| 2014/0278337 A1 | 9/2014 | Branson et al. |
| 2014/0280895 A1 | 9/2014 | Branson et al. |
| 2015/0058865 A1 | 2/2015 | Slinger et al. |
| 2015/0193368 A1 | 7/2015 | Caufield et al. |
| 2015/0269006 A1 | 9/2015 | Caufield et al. |

FOREIGN PATENT DOCUMENTS

| | | |
|---|---|---|
| EP | 1296220 A2 | 3/2003 |
| EP | 0963102 B1 | 1/2006 |
| JP | 2010115442 A | 5/2010 |
| JP | 4790793 B2 | 10/2011 |
| WO | 2006102442 A2 | 9/2006 |
| WO | 2014143247 A1 | 9/2014 |

OTHER PUBLICATIONS

Informatica, "Proactive Monitoring Option: Identify Data Integration Risks Early and Improve Governance with Proactive Monitoring", (Enterprise Data Integration: Power Center: Options), © 2013 Informatica Corporation. http://www.informatica.com/us/products/enterprise-data-integration/powercenter/options/proactive-monitoring-option/.

Oracle, "3: Monitoring the ETL Process", Oracle® Argus Mart Administrator's Guide, Release 1.0, Apr. 2013, Copyright © 2011, 2013 Oracle. http://docs.oracle.com/cd/E40596_01/doc.10/e38589/monitoringetl.htm#BGBHCCBH.

Battre et al., "Detecting Bottlenecks in Parallel DAG-based Data Flow Programs," 2010 IEEE Workshop on Many-Task Computing on Grids and Supercomputers, Nov. 15, 2010, pp. 1-10 DOI: 10.11091MTAGS.2010.5699429.

Ravali et al., "Implementing Bottleneck Detection Algorithm in IaaS Cloud for Parallel Data Processing Using," International Journal of Computer Science and Management Research, Aug. 2013, vol. 2, Issue 8 ISSN 2278-733X.

Warneke, D., "Massively Parallel Data Processing on Infrastructure as a Service Platforms," Sep. 28, 2011.

Iqbal et al., "SLA-Driven Automatic Bottleneck Detection and Resolution for Read Intensive Multi-tier Applications Hosted on a Cloud," Advances in Grid and Pervasive Computing, Lecture Notes in Computer Science vol. 6104, pp. 37-46, 2010, Copyright Springer-Verlag Berlin Heidelberg 2010.

Caufield et al., "Bottleneck Detection for Performance Management," U.S. Appl. No. 14/671,102, filed Mar. 27, 2015.

Mell et al., "The NIST Definition of Cloud Computing," National Institute of Standards and Technology, U.S. Department of Commerce, Special Publication 800-145, Sep. 2011.

Caufield et al., "Apparatus and Method for Identifying Performance Bottlenecks in Pipeline Parallel Processing Environment," U.S. Appl. No. 14/148,697, filed Jan. 6, 2014.

IBM, "General Purpose Bottleneck Analysis for Distributed Data Movement Applications," An IP.com Prior Art Database Technical Disclosure, IP.com No. 000138798, Original Publication Date: Aug. 4, 2006, IP.com Electronic Publication: Aug. 4, 2006.

Longcore, J., "Bottleneck identification in cycle time reduction and throughput improvement efforts in an automotive transmission plant," An IP.com Prior Art Database Technical Disclosure, IP.com No. 000128111, Original Publication Date: Dec. 31, 1999, IP.com Electronic Publication: Sep. 14, 2005.

* cited by examiner

GENERATING AND IMPLEMENTING DATA INTEGRATION JOB EXECUTION DESIGN RECOMMENDATIONS

BACKGROUND

The present disclosure relates to data integration, and more specifically, to performance monitoring and analysis for data integration.

Data integration may be described as extracting data from a source, transforming the data, and loading the data to a target. That is, data integration is Extract, Transform, Load (ETL) processing. Data integration processing engines may be scalable and capable of processing large volumes of data in complex data integration projects. It is common for multiple users (e.g., customers) and projects to share a single data integration processing engine that is responsible for handling all of the data integration processing for those multiple users. This high volume and highly concurrent processing may be resource intensive, and users try to balance the availability of system resources with the need to process large volumes of data efficiently and concurrently.

Workload management capabilities may be available at Operating System (OS) or lower levels. Workload management operates at a level that is removed from the data integration environment.

SUMMARY

According to embodiments of the present disclosure, a method, a performance analyzer, and a computer program product performing the method of managing performance of data integration are described. A performance analyzer may receive data about a data integration job execution. The performance analyzer may determine whether there is a performance issue of the data integration job execution. The performance analyzer analyzes the data about the data integration job execution when there is a performance issue. The performance analyzer generates a job execution design recommendation based on the analysis of the data and a set of predefined recommendation rules. The performance analyzer then displays the data about the data integration job execution and when there is a generated job execution design recommendation, displaying the job execution design recommendation.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

DETAILED DESCRIPTION

Aspects of the present disclosure relate to data integration, and more specifically, to performance monitoring and analysis for data integration. Aspects include executing a data integration job and collecting performance data and/or resource utilization data with a performance analyzer. The collected data may be presented to a user in real-time or as a replay with the performance analyzer for the user to determine and correct issues with the job flow of the data integration job. The performance analyzer may determine when an issue is present and recommended solutions to a user as to correct or lessen the issue. Definable rules when analyzing the data may help determine actions to correct for problems. While the present disclosure is not necessarily limited to such applications, various aspects of the disclosure may be appreciated through a discussion of various examples using this context.

In large data integration use cases, due to complex business requirements, it is common to have several hundreds of stages in a single data flow. To leverage system resources effectively, a parallel engine that executes such complex data flow may choose to implement a pipeline mechanism, that is, to have many processes concurrently executing and one's output is directed to another's input using various techniques such as shared memory, TCP/IP socket, or named pipe. With this technique, as soon as a record is produced by producer and written to the pipeline, it is read and processed by consumer. After this step finishes, this consumer writes its own output to next pipeline, which is further processed by its downstream consumers. All processes are simultaneously executing, and the intermediate results are not landed on disk, so such parallel engine architecture can efficiently leverage available system resources.

Further, to speed up data processing for large data set, the parallel engine may implement a data-partitioned mechanism, that is, an entire input dataset is partitioned into multiple smaller segments based on a specific partitioning algorithm, and each segment is sent to a separate instance of a processing stage. With this technique, if a processing stage needs to process 1 billion records, if using one instance, all 1 billion records would flow though that stage. If there are 2 instances of the same stage, and data is evenly distributed across those two instances, then each instance would process 500 million records. As long as the system still has available resources, partitioning would significantly reduce the total processing time of the entire data flow.

A parallel engine that implements both pipeline and data-partitioned mechanisms can deliver good performance and scalability for extract, transform, load (ETL) data flows. Today, numerous large enterprise customers rely on such systems to build their backbone for information integration and data warehousing applications.

From time to time, due to data flow design, network configuration, storage system performance issue, or parallel engine defect, customers may run into performance problems for parallel data flow, sometime those data flows can grind to halt. For example, some common performance problems are:

A custom operator that has inefficient algorithm

Incorrect buffering or sorting property that breaks the pipelining mechanism

Invalid/unexpected data causes one step to run into an infinite loop without any output being produced One of the steps makes a network call, for instance, trying to connect to a database server or a message queue end point, and the call blocks or takes very long time to return.

Slow disk I/O impacting sort

Insufficient memory impacting lookup/join

Too many concurrent executing jobs with limited resources

Large job with inefficient design patterns: incorrect fork-join patterns, unnecessary splitting and merging, duplicated stages Incorrect parameter settings When debugging such a problem, one has to collect information needed across various files, including job design, job execution log, input data files, schemas, configuration files, performance data files, etc. A typical debugging process starts with analyzing the job execution log. A log file could normally contain a lot of messages with no clear correlation between one another.

For simple to moderate data flows, it might be manageable to collect information from various files and manually analyze such information to find the root cause. For complex data flow that has several hundreds of stages with many partitioning methods employed, it can be very daunting to find out where the weakest spot or bottleneck is and what the right solution to solve the performance problem is. Very often, being able to pinpoint the exact bottleneck can significantly speed up the problem resolution.

Embodiments herein provide for a dynamic graphic view on job performance data regardless of whether the job is executed in a parallel execution environment or a distributed execution environment. In various embodiments, capabilities to analyze the performance data and present performance improvement recommendations to the end users are disclosed.

Figure 1:
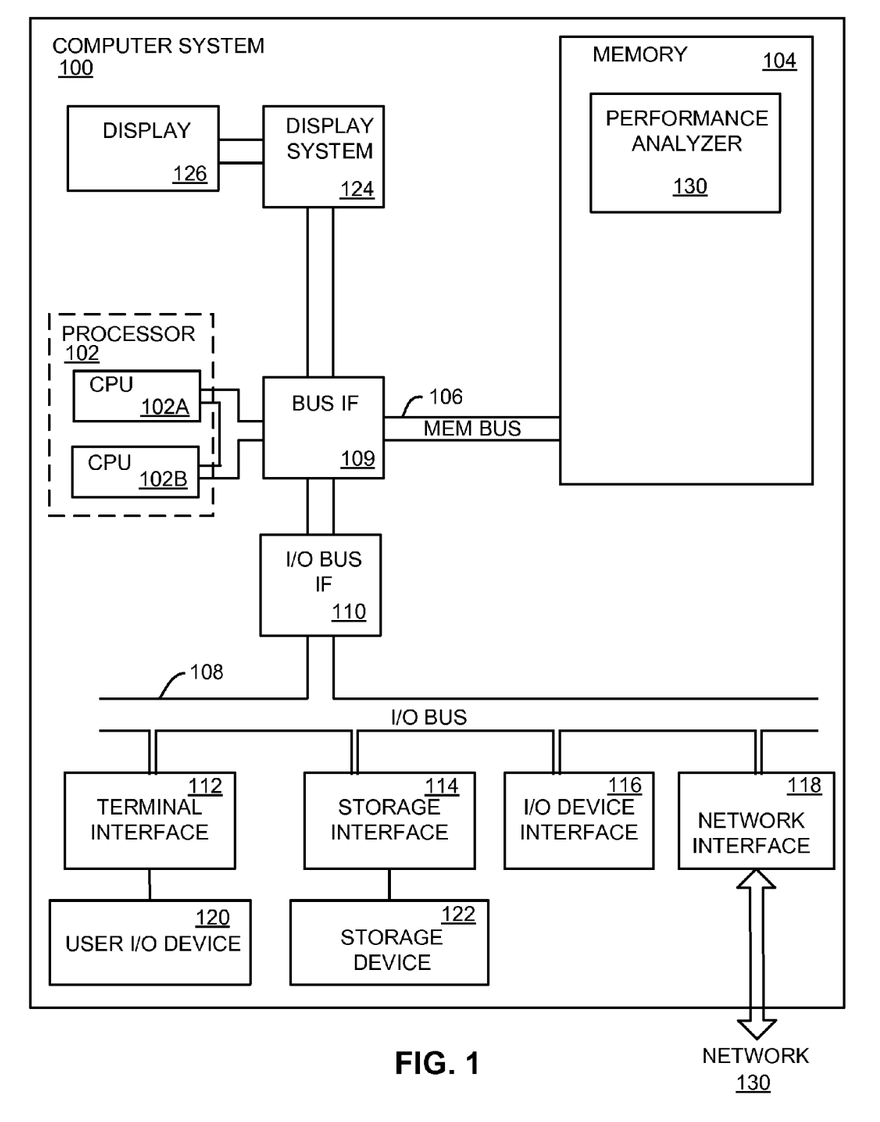
FIG. 1 depicts a schematic block diagram illustrating a computer system, according to various embodiments.

FIG. 1 is a schematic block diagram illustrating one embodiment of a computer system 100. The computer system 100 is one exemplary context in which embodiments may be implemented. The mechanisms and apparatus of the various embodiments disclosed herein apply equally to any appropriate computing system. The major components of the computer system 100 include one or more processors 102, a memory 104, a terminal interface 112, a storage interface 114, an Input/Output ("I/O") device interface 116, and a network interface 118, all of which are communicatively coupled, directly or indirectly, for inter-component communication via a memory bus 106, an I/O bus 108, bus interface unit ("IF") 109, and an I/O bus interface unit 110.

The computer system 100 may contain one or more general-purpose programmable central processing units (CPUs) 102A and 102B, herein generically referred to as the processor 102. In an embodiment, the computer system 100 may contain multiple processors; however, in another embodiment, the computer system 100 may alternatively be a single CPU system. Each processor 102 executes instructions stored in the memory 104 and may include one or more levels of on-board cache.

In an embodiment, the memory 104 may include a random-access semiconductor memory, storage device, or storage medium (either volatile or non-volatile) for storing or encoding data and programs. In another embodiment, the memory 104 represents the entire virtual memory of the computer system 100, and may also include the virtual memory of other computer systems coupled to the computer system 100 or connected via a network 130. The memory 104 is conceptually a single monolithic entity, but in other embodiments the memory 104 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 104 may store all or a portion of the following: a performance analyzer 130. This program and data structures are illustrated as being included within the memory 104 in the computer system 100, however, in other embodiments, some or all of them may be on different computer systems and may be accessed remotely, e.g., via a network 130. The computer system 100 may use virtual addressing mechanisms that allow the programs of the computer system 100 to behave as if they only have access to a large, single storage entity instead of access to multiple, smaller storage entities. Thus, while the performance analyzer 130 is illustrated as being included within the memory 104, it may not necessarily all be completely contained in the same storage device at the same time.

In an embodiment, performance analyzer 130 may include instructions or statements that execute on the processor 102 or instructions or statements that are interpreted by instructions or statements that execute on the processor 102 to carry out the functions as further described below. In another embodiment, performance analyzer 130 may be implemented in hardware via semiconductor devices, chips, logical gates, circuits, circuit cards, and/or other physical hardware devices in lieu of, or in addition to, a processor-based system. In an embodiment, the performance analyzer may include data in addition to instructions or statements.

The computer system 100 may include a bus interface unit 109 to handle communications among the processor 102, the memory 104, a display system 124, and the I/O bus interface unit 110. The I/O bus interface unit 110 may be coupled with the I/O bus 108 for transferring data to and from the various I/O units. The I/O bus interface unit 110 communicates with multiple I/O interface units 112, 114, 116, and 118, which are also known as I/O processors (IOPs) or I/O adapters (IOAs), through the I/O bus 108. The display system 124 may include a display controller, a display memory, or both. The display controller may provide video, audio, or both types of data to a display device 126. The display memory may be a dedicated memory for buffering video data. The display system 124 may be coupled with a display device 126, such as a standalone display screen, computer monitor, television, or a tablet or handheld device display. In an embodiment, the display device 126 may include one or more speakers for rendering audio. Alternatively, one or more speakers for rendering audio may be coupled with an I/O interface unit. In alternate embodiments, one or more of the functions provided by the display system 124 may be on board an integrated circuit that also includes the processor 102. In addition, one or more of the functions provided by the bus interface unit 109 may be on board an integrated circuit that also includes the processor 102.

The I/O interface units support communication with a variety of storage and I/O devices. For example, the terminal interface unit 112 supports the attachment of one or more user I/O devices 120, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 120 and the computer system 100, and may receive output data via the user output devices. For example, a user interface may be presented via the user I/O device 120, such as displayed on a display device, played via a speaker, or printed via a printer.

The storage interface 114 supports the attachment of one or more disk drives or direct access storage devices 122 (which are typically rotating magnetic disk drive storage devices, although they could alternatively be other storage devices, including arrays of disk drives configured to appear as a single large storage device to a host computer, or solid-state drives, such as flash memory). In another embodiment, the storage device 122 may be implemented via any type of secondary storage device. The contents of the memory 104, or any portion thereof, may be stored to and retrieved from the storage device 122 as needed. The I/O device interface 116 provides an interface to any of various other I/O devices or devices of other types, such as printers or fax machines. The network interface 118 provides one or more communication paths from the computer system 100 to other digital devices and computer systems; these communication paths may include, e.g., one or more networks 130.

Although the computer system 100 shown in FIG. 1 illustrates a particular bus structure providing a direct communication path among the processors 102, the memory 104, the bus interface 109, the display system 124, and the I/O bus interface unit 110, in alternative embodiments the computer system 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100 may, in fact, contain multiple I/O bus interface units 110 and/or multiple I/O buses 108. While multiple I/O interface units are shown, which separate the I/O bus 108 from various communications paths running to the various I/O devices, in other embodiments, some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, or any other suitable type of electronic device.

FIG. 1 is intended to depict the representative major components of the computer system 100, according to various embodiments. Individual components, however, may have greater complexity than represented in FIG. 1, components other than or in addition to those shown in FIG. 1 may be present, and the number, type, and configuration of such components may vary. Several particular examples of additional complexity or additional variations are disclosed herein; these are by way of example only and are not necessarily the only such variations. The various program components illustrated in FIG. 1 may be implemented, in various embodiments, in a number of different manners, including using various computer applications, routines, components, programs, objects, modules, data structures, etc., which may be referred to herein as "software," "computer programs," or simply "programs."

Figure 2:
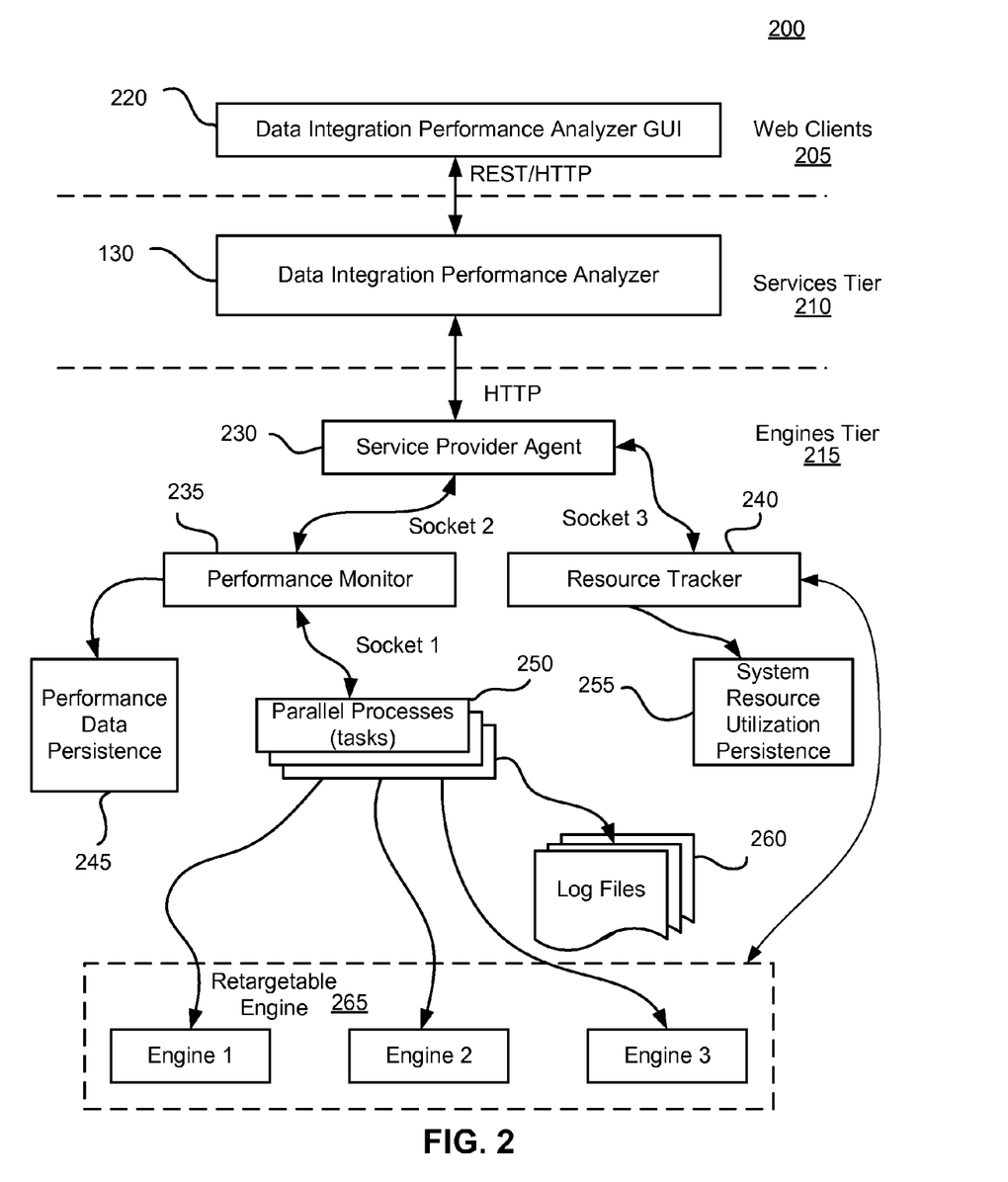
FIG. 2 depicts a system in which a performance analyzer operates, according to various embodiments.

FIG. 2 depicts a system 200 in which the performance analyzer 130 is incorporated, according to various embodiments. The performance analyzer 130 may be hosted in an application server and be made available as a web application. In other embodiments, the performance analyzer 130 may be hosted as a rich client application using Eclipse plug-in architecture, or implemented as C# application. FIG. 2 illustrates how to deploy the performance analyzer 130 as a web application as an example. The system 200 may include the web clients 205, the services tier 210, and the engines tier 215. The web client 205 may be where a user opens and executes the performance analyzer 130 with a performance analyzer graphical user interface (GUI) 220. The user may send requests through the performance analyzer GUI 220 to the performance analyzer 130, which may be executing commands on the services tier 210. The web clients 205 and the services tier 210 may be on separate machines that communicate over a network. In other various embodiments the performance analyzer GUI 220 and the performance analyzer 130 may be on the same machine.

The services tier 210 may include the performance analyzer 130 which may collect data from a data flow of a data integration job execution in the engines tier 215. The performance analyzer 130 may collect a job execution plan and design metadata, performance monitoring data, and system resource utilization data from the engines tier 215 where the data integration is occurring. The services tier 210 may also receive requests from the user in the web clients 205 on which data it needs to receive from the engines tier 215 and commands to send to the engines tier 215. The services tier 210 may be on a different server than the engines tier 215, the services tier 210 and the engines tier 215 may communicate over a network.

The engine tier 215 may be where the data integration job is being performed. A service provider agent 230 may be in communication with the performance analyzer 130 of the services tier 210. The service provider 230 may receive requests for data from the performance analyzer 130, retrieve the data that is requested by the performance analyzer 130, and send the data to the performances analyzer 130 over the network when the service tier 210 and engines tier 215 are on different servers. Within the engines tier 215 the service provider 230 may be in communication with a performance monitor 235 and a resource tracker 240 through respective sockets.

The performance monitor 235 may gather real-time performance data of the data flow of one or more parallel processes 250 of the data integration job. The gathering of performance data may be done at a tunable interval which may be based on every N records or every N seconds, for example. The parallel processes 250 may be multiple jobs being performed in multiple environments. The multiple environments may be different retargetable engines 265 such as a parallel engine or a distributed engine. The performance monitor 235 may also store the real-time performance data from the parallel processes 250 in a performance data database 245 for later use by serializing the data.

The resource tracker 240 may receive dynamic real-time system resource utilization data. The resource tracker 240 may also store system resource utilization data in a system resource utilization database 255 by serializing the data. The resource tracker may be in communication with the retargetable engines 265. The resource tracker 240 may be independent of the engine with which it communicates so the resource tracker 240 may be used to monitor resource utilization for both parallel and distributed environments. Log files 260 may also be produced by the parallel processes 250 and may be requested by the performance analyzer 130 and used by the performance analyzer 130 to determine areas of the data flow where data integration issues occur.

In various embodiments, the performance analyzer 130 may be requesting, gathering, and analyzing data in real-time while in an on-line mode. In various embodiments, the performance analyzer 130 may be used in an offline mode where the performance analyzer 130 receives past data of a data integration job execution by loading performance data from the performance data database 245, system resource data form the system resource utilization database 255, and log files 260, for example. The performance analyzer 130 should be able to replay the job execution in a simulated mode, so that users can understand how the job transitions its state and correlates state transitions to the job logs. Also, in offline mode, the performance analyzer 130 may build an execution plan representation and create snapshots to show job execution progress at various time intervals. The offline mode may be useful for post-execution (remote) analysis. For example, the user may send all the files to technical support. A support engineer may import all the files to the performance analyzer 130 and conduct post-execution analysis to identify any performance patterns or issues.

In the on-line, real-time analysis done the by the performance analyzer 130, a request may be sent from the web-client 205 to the performance monitor 235 to receive an execution plan and metadata information of the job execution. The performance analyzer 130 uses this information to build the data flow representation. The performance analyzer 130 then regularly polls performance data and resource utilization data to show job execution progress. The performance analyzer 130 may be used to analyze the performance for job executions on different types of retargetable engines 265 (e.g. parallel engine or distributed engine).

Figure 3:
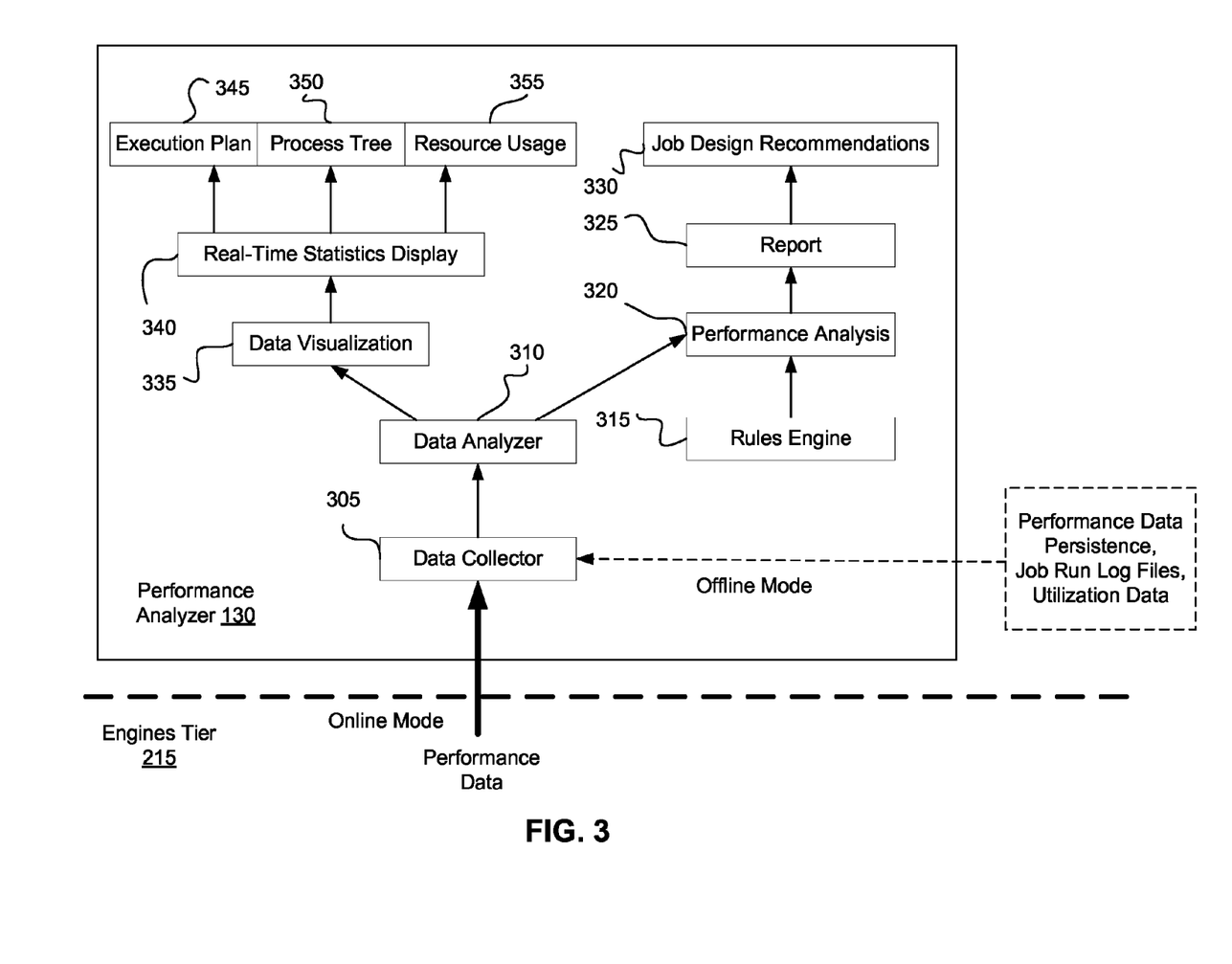
FIG. 3 illustrates a block diagram of components of the performance analyzer, according to various embodiments.

FIG. 3 illustrates a block diagram of components of the performance analyzer 130, according to various embodiments. The performance analyzer may have components that include a data collector 305, data analyzer 310, a rules engine 315, a performance analysis module 320, a report 325, one or more job design recommendations 330, a data visualization module 335, and a statistics display 340 that may display an execution plan 345, a process tree 350, and resource usage 355.

In various embodiments, the data collector 305 may receive data from the engines tier 215 of FIG. 2. The data may include performance data and resource utilization data in the online mode. In an offline mode, the data collector 305 may receive performance data from the performance data persistence 245, job execution log files 260, and system resource utilization data from the system resource utilization persistence 255. The data collector 305 may send the data collected to the data analyzer 310. The data analyzer 310 may determine which data to send to the performance analysis module 320 and the data visualization module 335.

The performance analysis module 320 may analyze the data coming into the performance analyzer 130 with one or more rules from the rules engine 315. The rules engine 315 may have one or more rules that may define certain actions to take when data shows a certain criteria. The rules may be flexible in that an operator may define the rules. Based on the analysis of the rules and the data, the performance analysis module 320 may produce the report 325. The report 325 may include recommendations that a user may take to correct performance issues. The recommendations may be accessible to a user in the performance analyzer graphical user interface 220 of FIG. 2 in the job design recommendations view 330.

In various embodiments, the data analyzer 310 may send data to the data visualization module 335. The data visualization module 335 may compile the data into visual displays such as a statistic display 340. The statistic display 340 may display through the performance analyzer GUI 220 graphical execution plan 345, the process tree 350, and resource usage 355. These visual displays may assist the user in determining corrective action for performance issues and where the performance issues are occurring.

Figure 4:
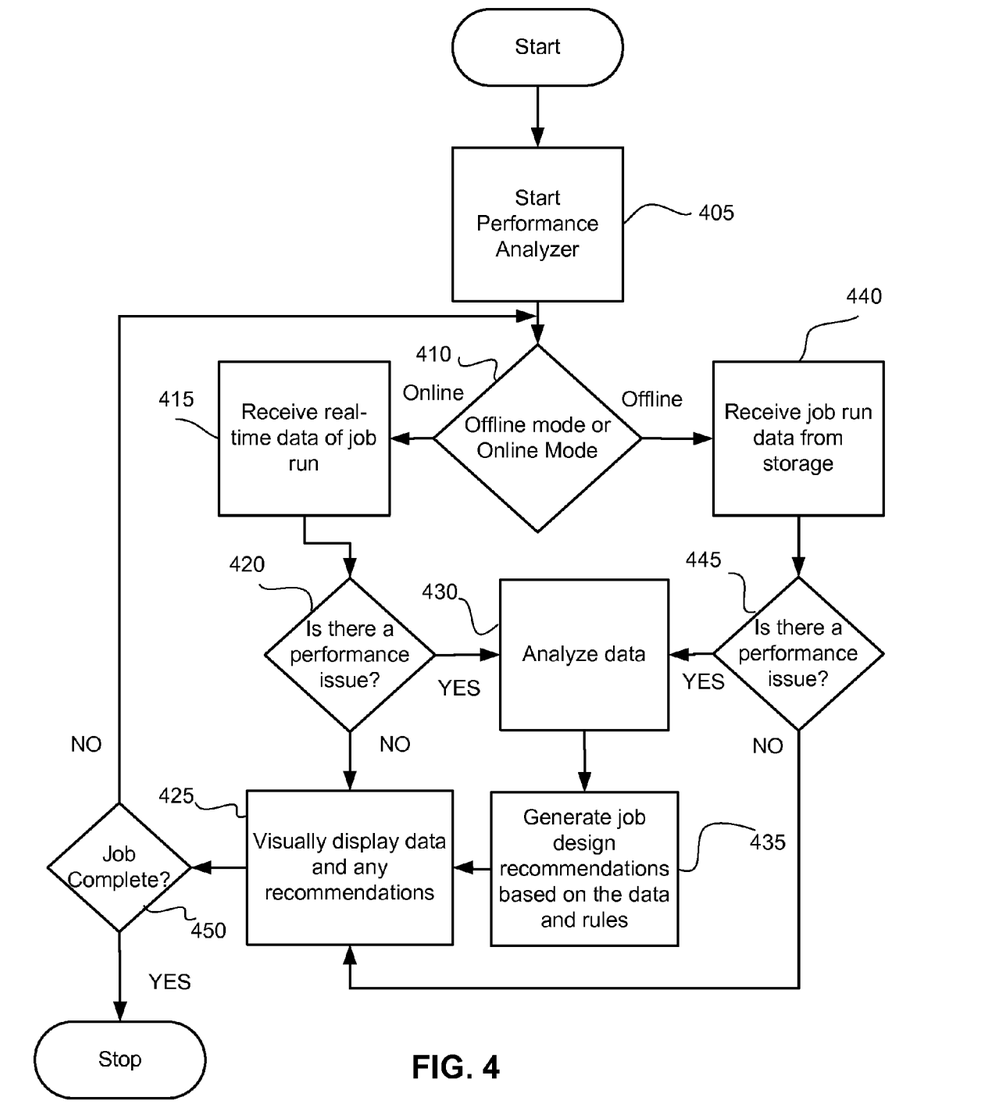
FIG. 4 illustrates a flow diagram of a method of monitoring and analyzing data integration, according to various embodiments.

FIG. 4 illustrates a flow diagram of a method 400 of monitoring and analyzing data integration, according to various embodiments. In operation 405, the performance analyzer may be initiated. In operation 410, the performance analyzer may be ran in an offline mode or an online mode. If the performance analyzer in is in an online mode, then a data integration job is being performed while the performance analyzer is executing and the method 400 may continue with operation 415. In operation 415, the performance analyzer may receive real-time data of the data integration job such as performance data and resource utilization data. The method 400 may continue with operation 420.

In operation 420, the performance analyzer may determine from the data of the data integration job whether there is a performance issue or not. If there is no performance issue, then the performance analyzer may visually display the data of the data integration in operation 425 and the method 400 may end. If there is a performance issue, then the performance analyzer may analyze the data it receives from the data integration in operation 430. The data analyzer of the performance analyzer may determine what is causing the issue based on rules. The data analyzer may generate recommendations for the job design of the data integration job in operation 435 which is also based on the rules, the issue from the analysis, and data. The method 400 may continue with operation 425. In operation 425, the performance analyzer may visually display data and any recommendations the performance analyzer determined. The method 400 may continue to operation 450. In operation 450, the performance analyzer may determine whether the data integration job is still performing. If it is not, then the method 400 may end. If the data integration job is still running, then the method may return to operation 410 to gather more data from the data integration job and analyze it.

Returning to operation 410, if the performance analyzer is in an offline mode, then the method 400 may continue with operation 440. In operation 440, the performance analyzer may receive persistent data of a previously executed job. The persistent data may include the performance data and resource utilization data. In operation 445, the performance analyzer may determine from the persistent data whether there is a performance issue with the past job execution being analyzed. If there is a performance issue, then the method 400 may continue to operation 430. In operation 430, the performance analyzer may analyze the data. In operation 435, the performance analyzer may generate job design recommendations based on the persistent data and rules. The method 400 may continue with operation 425. In operation 425, the performance analyzer may visually display data and any recommendations the performance analyzer determined.

Returning to operation 445, if there is no performance issue with the past job execution, then the method 400 may continue with operation 425. In operation 425, the performance analyzer may visually display data for a user to view. The method 400 may continue to operation 450. In operation 450, the performance analyzer may determine whether the data integration job is still performing. If it is not, then the method 400 may end. If the data integration job is still running, then the method may return to operation 410 to gather more data from the data integration job and analyze it.

Figure 5:
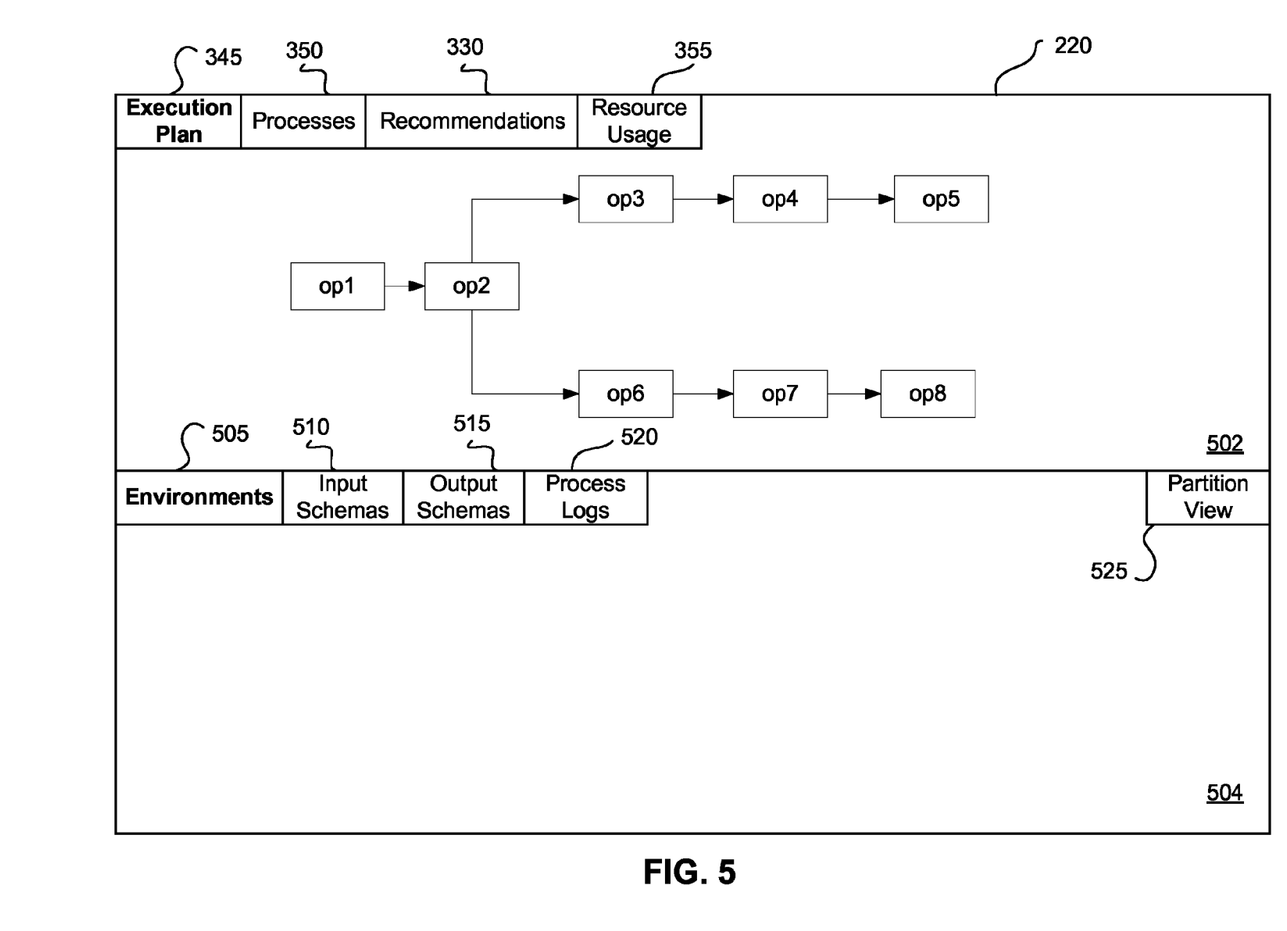
FIG. 5 illustrates an example view of the data integration performance analyzer graphical user interface, according to various embodiments.

FIG. 5 illustrates an example view of the data integration performance analyzer graphical user interface (GUI) 220, according to various embodiments. The GUI 220 may include two sections: a top panel 502 and a bottom panel 504. The top panel 502 may include views of the Execution Plan 345, Processes 350, Recommendations 330, and Resource Usage 355. The bottom panel 504 may include displays of detailed information for the selected views in the top panel 502.

One of the views in the top panel 502 of the GUI 220 may be the Execution Plan 345. The actual job execution plan may be different from the job flow in the design environment. The Execution Plan 345 may illustrate the designed job flow which may be different than the actual job flow. The Processes view 350 may display the actual job flow. There are several factors that may cause the actual job flow to differ from the design job flow. One factor may be partitioning and sort insertion. To satisfy parallel job design semantics, or to avoid hanging process for certain job design patterns (e.g. fork-join pattern), the parallel framework may insert partitioners, sort, or buffer operators to the user-specified data flow. Another factor that may cause the actual job flow to differ from the design job flow may be operator combining. Two or more combinable operators may be combined into a single process to improve efficiency and reduce resource usage. Another factor may be composite operators. One single stage operator may be expanded into multiple sub-level operators to implement processing logic. Parallelism is another factor. A parallel stage may have multiple player instances to implement data-partitioned parallelism.

Monitoring top-level design job flow may not provide enough information to understand what has actually happened during the job execution because of the differences between the design job flow and the actual executed job flow. Being able to monitor low-level runtime execution plan to track the performance of each operator of the job while the job is executing may be useful to the user. By selecting the Execution Plan 345, the designed job flow execution may be presented. In embodiments, the Execution Plan 345 may be displayed as a direct acyclic graph where the data flow order is from left to right, e.g. the data source is presented on the left side and the target is presented on the right side.

FIG. 5 illustrates a plurality of operators (op1-op8) that may illustrate the designed job flow of the Execution Plan 345 in the top panel 502. A user may select any operator presented in the graphic representation of the Execution Plan 345. The user may use the graphical representation for monitoring the performance at the partition level. When an operator (op1-op8) is selected, its performance related information may be displayed in the bottom panel 504 on a per partition basis. Some of the information displayed on the bottom panel 504 may include properties of the selected operator. Some of the properties may include the name and ID of the operator, partitioning method, collection method, sort information, and type of operator such as (inserted, composite, and combined). The type of operator may include the operator's effect on the execution plan. Some of the information displayed may be tabbed in the bottom panel 504. One tab may be Environments tab 505 which may contain information on environmental variables. Other tabs may include Input Schemas 510 and Output Schemas 515. These may be one or more tabs and sub-tabs to represent respective input and output links. Each tab or sub-tab may display the schema of the corresponding input link or output link.

A Process Logs tab 520 may also be in the bottom panel 504. The Process Logs tab 520 may display the messages produced by the selected operator. Furthermore, the bottom panel 504 may display a number of job execution statistics. The job execution statistics may include the number of input records consumed, number of output records produced, input throughput, output throughput, CPU utilization, memory utilization, I/O utilization, disk space utilization, and scratch space utilization, for example. The partitions of each operator may be changed with a partition view tab 525. By selecting the partition of an operator, if any, the performance information discussed above may be displayed for the selected partition of the selected operator.

Figure 6:
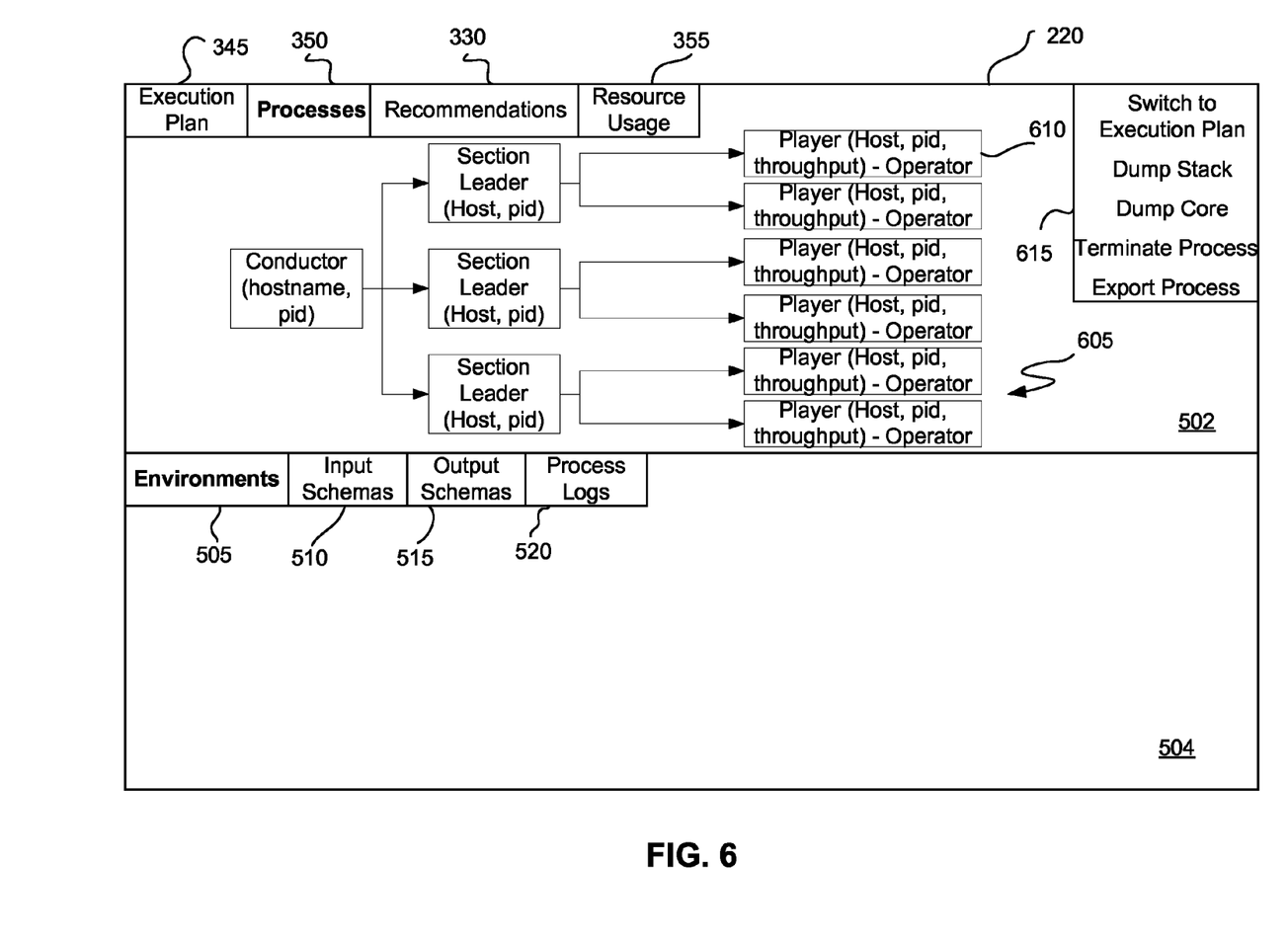
FIG. 6 illustrates another view of the graphical user interface of FIG. 5, according to various embodiments.

FIG. 6 illustrates the Processes view 350 of the GUI 220, according to various embodiments. The Processes view 350 may display the actual job flow instead of the design job flow as in the Execution Plan view 345. The actual job flow may be displayed as, but not limited to, a process tree structure 605 as shown in the top panel 502. The process tree structure 605 may be made of a plurality of process entries, such as process entry 610. The label of each process entry in the process tree structure 605 may include:

Process Type (Host:"hostname", PID:"pid", CPU: "cpu", Memory:"memory", IO:"io")
Command line For example, process entry 610 may be labeled as such:
Player (Host:isdev, PID:5529, CPU:30%, Memory:256 MB, IO:30%) C:\apt\bin\osh-f e98726.osh In various embodiments, the label may be customizable.

The Process view 350 may also include several other menu items in menu 615. Some of the other items may be, but not limited to, Switch to Execution Plan, Dump Stack, Dump Core, Terminate Process, and Export Process. The Switch to Execution Plan option may allow a user to switch to the operator in the execution plan that correlates to a selected process entry. The Terminate Process option may terminate an executing process. The Export Process option may persist the job process structure into plain text, HTML, or XML files for further analysis.

The Dump Stack option, when selected, may send a signal to an executing process to dump its execution stack. If the executing process is a player process (leaf node), then the Dump Stack option may cause the player process to dump its stack. If the executing process selected is a section leader process, then selecting the Dump Stack option may trigger the section leader plus any children process entries to dump their stacks. If the executing process is the conductor process (root node), the Dump Stack option triggers all of the executing processes associated with the job to dump their stacks.

The Dump Core option, when selected, may send a signal to an executing process to dump its process image. If the executing process is a player process (leaf node), then the Dump Stack option may cause the player process to dump its process image. If the executing process selected is a section leader process, then selecting the Dump Stack option may trigger the section leader plus any children process entries to dump their process images. If the executing process is the conductor process (root node), the Dump Stack option triggers all of the executing processes associated with the job to dump their process images.

By selecting a process entry in the process tree structure 605, the information related to the process entry may be displayed in the bottom panel 504. The information may include environmental variables, input schemas, output schemas, and process logs. Respective Environments tab 505, Input Schemas tab 510, Output Schemas tab 515, and Process Logs tab 520 may allow the user to select the information of the process entry to view. Other information, not limited to the information that is displayed for operators in FIG. 5, could also be displayed for the process entries.

Also illustrated in FIG. 5 and FIG. 6 is an option to select the Recommendations view 330. As illustrated in FIG. 3 the performance analyzer 130 may generate a report 325 that contains the recommendations on how to optimize job design for better performance. The performance analyzer 130 may analyze performance results and may provide a set of selective changes for each issue identified. One recommendation may be about flow pattern validation. The performance analyzer 130 may analyze the performance results and correlates those results with the data flow design to help identify potential deadlocks, incorrect fork-join patterns, unnecessary split and merge, unneeded stages, stages that may be simplified or replaced, optimal break-down sub-flows, and use of shared/local containers, for example.

Other sample rules that may be used in making recommendation decisions include: parallel configuration, buffer tuning, partitioning and sort insertion, operator combining, and operator selection. Parallel configuration recommendations include the number of logical and physical partitions, node pools, and node constraints. For a job with a large number of stages, one-node logical node configuration could lead to a large number of processes at runtime. If multiple logical nodes are used, performance could degrade due to resource contention. An optimal design may be to reduce the number of logical partitions and increase the number of physical partition if possible. For a small job that executes across multiple physical partitions, it may be optimal to increase the logical partition and keep all the logical partitions on the same server to minimize data transport across the network.

Buffer tuning such as buffer insertion and parameter settings may be a recommendation. Buffer tuning may help avoid deadlock situations caused by fork-join patterns or remove bottlenecks. Recommendations would let the user know where, why, and how to turn on buffering.

Partitioning and sort insertions may be yet another recommendation, which may include partitioning method consolidation and sort keys decomposition. An example is to partition and sort data upfront at the start of the data flow and keep the partitioned data and sort order up to the point where needed. This may be better than using inconsistent keys through the entire data flow as data has to be repartitioned and sorted wherever keys are changed. Another example is to refine partitioning keys. If data is skewed across partitions for a particular stage, one can consider modifying the keys used to partition the data by adding more keys or picking up different keys that can lead to even data distribution across all of the partitions.

Recommendations may also be made for operator combining. The recommendation may determine whether or not to enable or disable operator combining based on, but not limited to, the number of processes executing on the system, CPU utilization, I/O throughput, and disk space usage. For example, if multiple sort operators are combined to execute in the same process, then only one sort may execute at a time. All other sorts are blocked for receiving more input. It may be optimal to disable sorts if the input data volume is large, so that disk I/O will be better utilized. If input data volume is small, combining sorts would probably be acceptable as sorting is most likely done in memory. Another example may be connectivity operators. If a database operator is combined with upstream processing operators and the database legacy slows down the entire process, then the combination for the database operator may be disabled so upstream processing operators may be impacted less by the database performance.

Another recommendation may be the selection of an operator. It may be important to understand performance characteristics of an operator in terms of CPU, memory, I/O. or disk space utilization. This may help select an operator that can fulfill a specific application need. For example, lookup, join, or merge can all combine data from different streams into one stream, but each operator may have its own performance characteristics. Lookup may work better for small sharable tables. Lookup may also be updatable and range lookup capabilities which join and merger do not have. Join may work well for large size reference table, and merge may work well for multiple tables. Another example may be choosing modify/filter/transform. Using modify or filter may achieve data conversions and constraints which are available in transform, but with less overhead. On the other hand, transform has looping capabilities and more advanced transformation logic. In other examples, users may need to choose between using multiple lookup tables within one lookup versus one lookup table with multiple lookups, and using sequential files over parallel datasets.

To make these recommendations, the performance analyzer 130 may support pluggable rules the performance analyzer may follow when making recommendations. Any stage written in application programming interfaces (API) executing on parallel framework may provide a pre-defined set of rules to inform Performance Analyzer how to make recommendations based on some specific performance data. For example, the rules used to define a bottleneck may be pluggable. On may use the relative throughput or an absolute throughput to define a bottleneck. An absolute throughput is a hard limit such as the number of records per second. By default, there may be a job wide hard limit, any operator whose throughput is below the hard limit may be considered a bottleneck. An operator with specific processing need may override this hard limit by calling a rule API. A relative throughput is throughput in percentage compared to other operators. An example of a rule may be that if the throughput of an operator is 50% less than its producing operator, then this operator may be considered a bottleneck.

Furthermore, in FIG. 5 and FIG. 6 is a Resource Usage view 355. The Resource Usage view 355 may display a number of charts or graphs for, but not limited to, system CPU usage, I/O usage, and memory usage. It may display information collected and analyzed by the performance analyzer 130. The Resource Usage view 355 may be used by the user to evaluate the actual job flow.

Referring back to FIG. 1, embodiments may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of managing performance of data integration comprising:
receiving data about the data integration job execution, wherein the data integration job is for an extract, transform, and load (ETL) job;
determining whether there is a performance issue of the data integration job execution;
analyzing the data about the data integration job execution when there is a performance issue;
generating and implementing a job execution design recommendation based on analyzing the data and a set of predefined recommendation rules, wherein the set of predefined recommendation rules comprises an operator combining recommendation, wherein the operator combining recommendation specifies that the processes of two or more operators are to be carried out by a single operator; and
displaying the data about the data integration job execution and when there is a generated job execution design recommendation, displaying the job execution design recommendation, wherein the displaying the data of the data integration job includes displaying an execution plan of a designed job execution and a process view of one or more processes of an actual job execution.

2. The computer-implemented method of claim 1, wherein the data received is performance data of the data integration job execution and resource utilization data of an environment in which the data integration job execution is occurring.

3. The computer-implemented method of claim 1, wherein the receiving the data about the data integration job is performed in real-time.

4. The computer-implemented method of claim 1, wherein the receiving the data about the data integration job is retrieved from a memory.

5. A performance analyzer, comprising:
a processor; and
a memory communicatively coupled to the processor, wherein the memory is encoded with instructions and wherein the instructions when executed by the processor include:
receive data about the data integration job execution, wherein the data integration job is for an extract, transform, and load (ETL) job;
determine whether there is a performance issue of the data integration job execution;
analyze the data about the data integration job execution when there is a performance issue;
generate and implement a job execution design recommendation based on analyzing the data and a set of predefined recommendation rules, wherein the set of predefined recommendation rules comprises an operator combining recommendation, wherein the operator combining recommendation specifies that the processes of two or more operators are to be carried out by a single operator; and
display the data about the data integration job execution and when there is a generated job execution design recommendation, displaying the job execution design recommendation, wherein the displaying the data of the data integration job includes displaying an execution plan of a designed job execution and a process view of one or more processes of an actual job execution.

6. The performance analyzer of claim 5, wherein the data received is performance data of the data integration job execution and resource utilization data of an environment in which the data integration job execution is occurring.

7. The performance analyzer of claim 5, wherein the receiving the data about the data integration job is performed in real-time.

8. The performance analyzer of claim 5, wherein receiving data about the data integration job is retrieved from a memory.

9. A computer program product of managing performance of data integration, the computer program product comprising a computer readable storage medium having program code embodied therewith, the program code executable by a computer system to:
receive data about the data integration job execution, wherein the data integration job is for an extract, transform, and load (ETL) job;
determine whether there is a performance issue of the data integration job execution;
analyze the data about the data integration job execution when there is a performance issue;
generate and implement a job execution design recommendation based on analyzing the data and a set of predefined recommendation rules, wherein the set of predefined recommendation rules comprises an operator combining recommendation, wherein the operator combining recommendation specifies that the processes of two or more operators are to be carried out by a single operator; and
display the data about the data integration job execution and when there is a generated job execution design recommendation, displaying the job execution design recommendation, wherein the displaying the data of the data integration job includes displaying an execution plan of a designed job execution and a process view of one or more processes of an actual job execution.

10. The computer program product of claim 9, wherein the data received is performance data of the data integration job execution and resource utilization data of an environment in which the data integration job execution is occurring.

11. The computer program product of claim 9, wherein the receiving the data about the data integration job is performed in real-time.

12. The computer program product of claim 9, wherein receiving data about the data integration job is retrieved from a memory.

* * * * *